United States Patent
Galati

(10) Patent No.: US 9,837,821 B2
(45) Date of Patent: Dec. 5, 2017

(54) ENERGY ALLOCATION FOR ENERGY STORAGE COOPERATION

(75) Inventor: Richard C. Galati, Garden Grove, CA (US)

(73) Assignee: Green Charge Networks LLC, Santa Clara, CA (US)

(*) Notice: Subject to any disclaimer, the term of this patent is extended or adjusted under 35 U.S.C. 154(b) by 1026 days.

(21) Appl. No.: 13/301,723

(22) Filed: Nov. 21, 2011

(65) Prior Publication Data

US 2012/0242148 A1 Sep. 27, 2012

Related U.S. Application Data

(60) Provisional application No. 61/467,908, filed on Mar. 25, 2011, provisional application No. 61/467,929, filed on Mar. 25, 2011.

(51) Int. Cl.
H02J 3/28 (2006.01)
H02J 3/14 (2006.01)

(52) U.S. Cl.
CPC ........ *H02J 3/14* (2013.01); *H02J 3/28* (2013.01); *Y02B 70/3225* (2013.01); *Y04S 20/222* (2013.01); *Y04S 20/224* (2013.01); *Y10T 307/469* (2015.04)

(58) Field of Classification Search
CPC .......... H02J 3/14; H02J 3/28; Y02B 70/3225; Y10T 307/469; Y04S 20/224; Y04S 20/222

See application file for complete search history.

(56) References Cited

U.S. PATENT DOCUMENTS

| | | | |
|---|---|---|---|
| 6,037,758 A | 3/2000 | Perez | |
| 6,134,124 A | 10/2000 | Jungreis | |
| 6,542,791 B1 | 4/2003 | Perez | |
| 6,889,122 B2 | 5/2005 | Perez | |
| 6,900,556 B2 | 5/2005 | Provanzana | |
| 6,902,837 B2 | 6/2005 | McCluskey | |
| 7,060,379 B2 | 6/2006 | Speranza | |
| 8,442,698 B2 * | 5/2013 | Fahimi | H02J 3/32 700/287 |
| 8,588,989 B1 * | 11/2013 | Heath | G06F 1/26 700/286 |
| 2001/0043013 A1 | 11/2001 | Abe | |
| 2004/0084965 A1 | 5/2004 | Welches | |

(Continued)

*Primary Examiner* — Daniel Kessie
(74) *Attorney, Agent, or Firm* — Holland & Hart LLP

(57) ABSTRACT

Systems that allow energy allocation for energy storage cooperation are disclosed, with specific methods outlined concerning allocating energy stored by an energy storage device between a utility provider, a customer, and/or a third party. The methods may include allocating a portion of stored energy for a utility provider's benefit which may be gained as a result of a part of the allocated energy being dispatched into a utility network and allocating another portion of energy stored in the energy storage device for the benefit of the customer. Additional embodiments disclose the dispatching of the energy stored, signals used to bring about a dispatch, the nature of the relationship between the utility provider, the customer, and the energy stored, methods for making energy available to a utility provider without a prearranged reservation of the energy, penalties for misallocating energy, apparatus for allocating energy and causing dispatch, and more.

16 Claims, 5 Drawing Sheets

(56) References Cited

U.S. PATENT DOCUMENTS

| | | | |
|---|---|---|---|
| 2007/0005192 A1 | 1/2007 | Scholettle | |
| 2008/0167756 A1 | 7/2008 | Golden | |
| 2008/0191675 A1 | 8/2008 | Besser | |
| 2010/0017045 A1 | 1/2010 | Nesler | |
| 2010/0072947 A1* | 3/2010 | Chan | H02J 7/0016 320/134 |
| 2010/0327800 A1 | 12/2010 | Reineccius | |
| 2011/0133655 A1* | 6/2011 | Recker | H02J 9/02 315/159 |
| 2011/0193518 A1* | 8/2011 | Wright | H01M 10/44 320/101 |
| 2011/0196692 A1* | 8/2011 | Chavez, Jr. | B60L 11/1824 705/1.1 |
| 2011/0309799 A1* | 12/2011 | Firehammer | H02J 7/0016 320/134 |
| 2012/0101921 A1* | 4/2012 | Anderson | F23G 5/04 705/30 |

* cited by examiner

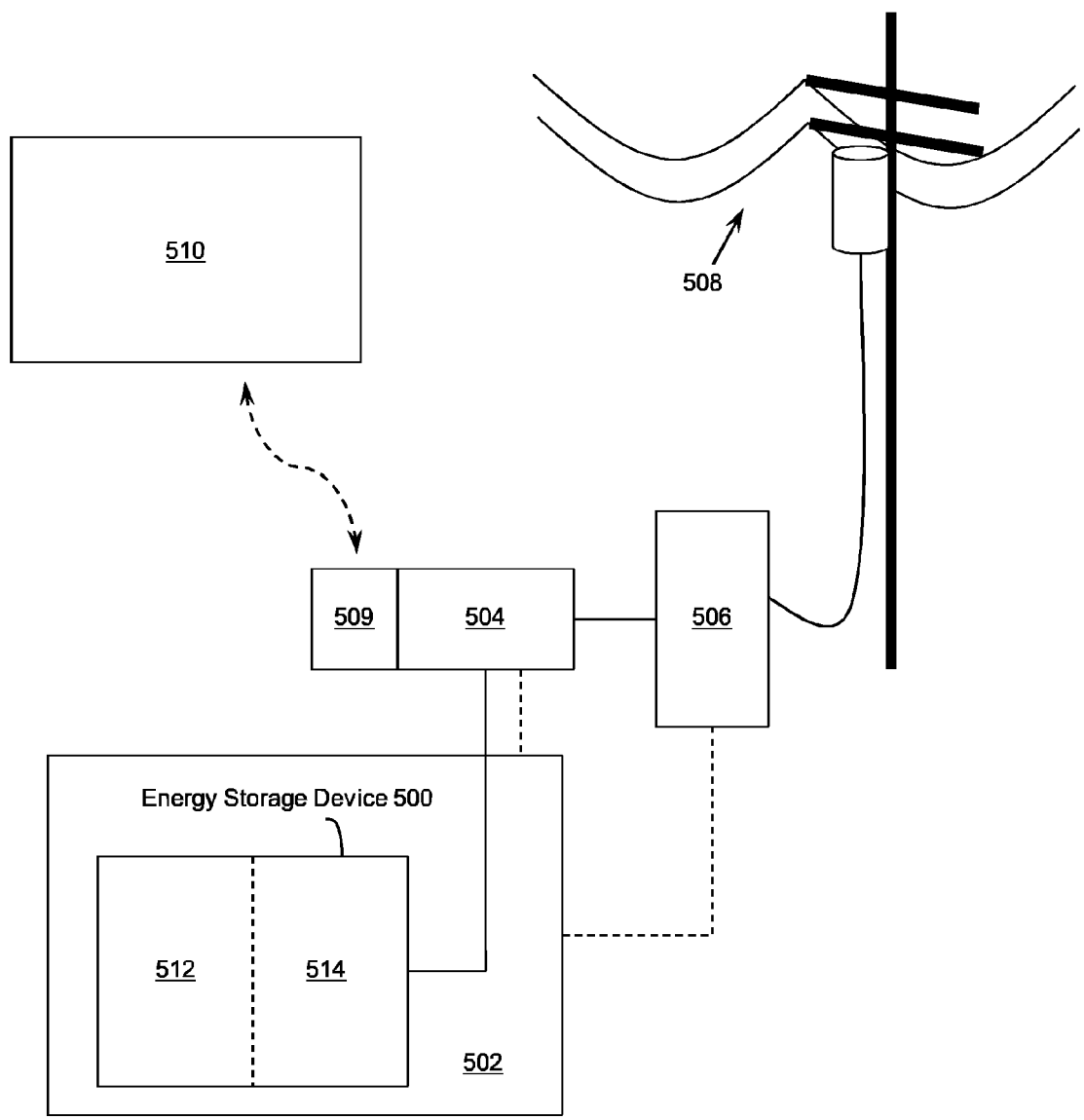

ENERGY ALLOCATION FOR ENERGY STORAGE COOPERATION

CROSS-REFERENCE TO RELATED APPLICATIONS

Priority is claimed to U.S. Provisional Patent Applications 61/467,908 and 61/467,929, both filed Mar. 25, 2011, which are hereby each incorporated by reference in their entirety.

BACKGROUND

The present invention relates to the field of electrical utility distribution and energy storage management and apparatuses and processes associated therewith.

Today's electrical utility providers operate in a quickly-changing environment with limited resources and little room for error. Power demands placed on the utility grid may continuously and randomly fluctuate while the requirements necessary to satisfy these demands change on an hourly basis. Although hourly demands are somewhat predictable, utilities are expected to provide consistent and reliable power, regardless of what occurs in real time. Due to peaks in demand during the waking hours of 6 a.m. to 10 p.m., and during summer months, electricity providers contract with "peaking" power plants to receive energy for a limited time as needed to provide power when normal power plant production cannot match demand. Peaking plants are an expensive source of power, so electricity providers pass on some of the costs of providing that power by billing a "demand charge" to certain types of customers based on the magnitude of their highest recorded energy consumption during a billing period. This practice gives customers an incentive to avoid causing spikes in energy consumption, so that electricity providers reduce their dependence on additional peaking power plants to meet service capacity requirements. Minimizing consumption spikes also delays or eliminates the need to upgrade the electrical distribution infrastructure which is primarily constructed to compensate for periods of highest consumption.

Peaks in consumption have also lead utility providers to enact "demand response" programs, where some consumers are offered incentives if they reduce their burden on the grid at designated times or at the utility provider's request. For example, a consumer may receive a payment from the power company each month in exchange for a guarantee that it will reduce its demand when requested. Participation in these programs reduces the load on the grid and may be particularly effective at keeping transmission infrastructure (e.g., transformers, substations) from overloading under peak demand conditions. However, it is often difficult to track whether customers actually comply with their reduction obligation, and determining the amount of reduction produced by each customer may be challenging.

In response to being billed for demand charges, customers have sought to develop inventive peak mitigation and load leveling methods to save money by making more efficient use of their electrical resources. Peak mitigation methods are designed to reduce or completely remove peaks in consumption, such as by turning off loads (i.e., "load shedding") when peak conditions approach or by using power generation or energy storage to provide power to the site during peak periods, so that the peak power that is actually measured by the electrical provider is lower than it otherwise would be. Load leveling methods are designed to reduce loads during prolonged peak periods by discharging energy storage to supplement grid-provided power to a site, then to recharge the energy storage during off-peak periods to prepare for the next peak period, thereby "leveling" the overall consumption curve of the site and reducing demand charges. For periods where power blackouts and other outages occur, consumers may have backup power supplies installed to keep vital electronics from experiencing interruptions in service. In some cases, the backup power supplies are not frequently used and their energy storage capabilities end up wasted. In other cases, utility providers and customers work together using energy storage devices to mitigate loads at the customers' sites so that the demand experienced by the surrounding grid is reduced, but the energy available to the utility providers for this purpose can be limited or reduced as the customer accesses the energy storage for its own purposes, and the energy may only be used to reduce demand at the site in which the storage device is located.

BRIEF SUMMARY

In at least one aspect of the invention, some embodiments of the methods and apparatuses for allocating energy stored in energy storage devices disclosed herein may increase efficiency and reduce the total cost of ownership and other costs of the energy storage devices, power management systems, and backup power supplies deployed by customers by allocating the energy stored in these devices for the benefit of multiple parties, such as utility providers and customers. By allocating energy storage, utility providers such as electricity providers may benefit by having a ready source of supplemental energy reserved or on call for dispatch within their utility networks when demand response or other energy dispatch is needed, thereby reducing their reliance on peaking power plants, and customers may put energy to use that could otherwise be wasted.

In one embodiment of the invention, a method is provided that concerns allocating energy between a utility provider and a customer, wherein the method comprises allocating a first portion of energy stored in the energy storage device for the benefit of the utility provider, which benefit may be gained by the utility provider as a result of a part of the first portion of allocated energy is dispatched to a utility network, and allocating a second portion of energy stored in the energy storage device for the benefit of the customer. Here, the portions of stored energy referred to in this embodiment may include a physical portion of an energy storage device, such as individual cells of an electrical battery, or may be a portion of the stored energy itself, such as a number of kilowatt-hours or Joules of energy in the energy storage device. The utility provider may be an administrator of a utility distribution network, a power production administrator, or employees, agents, and subsidiaries acting on behalf of the administrators.

In another embodiment, the method further comprises storing the first portion of allocated energy and the second portion of allocated energy in the energy storage device. This may ensure that the allocated energy can be found in one place when the customer or utility provider needs access to it.

In another embodiment, the method further comprises yielding part of the first portion of allocated energy into the utility network. Here, for example, the yielding may be an actual transfer of energy of the allocated energy to the utility network, or it may simply comprise turning over or providing access for an entity to reach part of the first portion of allocated energy in the utility network.

In another related embodiment, the yielding of allocated energy is performed at the discretion of the utility provider. For example, the utility provider may have control over whether allocated energy is yielded to the utility network such that the holder of the allocated energy is obligated to yield the energy when the utility provider deems it is necessary. The utility provider may be the one yielding the allocated energy as well, in which case a decision to yield allocated energy does not require approval or other reinforcement by another party or entity.

In yet another embodiment, the method further comprises receiving part of the first portion of allocated energy into the utility network. For example, the operator of the utility network may receive part of the first portion of allocated energy by registering that energy has been dispatched from the energy storage device in a customer's site into other components of the utility network, such as, for example, transmission lines, sensors, transformers, substations, and other power features, or may receive the energy by storing it in another energy storage device in the utility network.

In yet another embodiment, the method further comprises preventing the customer from consuming the at least one of the first portion of allocated energy or the second portion of allocated energy. For example, a utility provider may prevent the customer from consuming the allocated energy by disabling the energy storage device, disabling the discharging or dispatching ability of the energy storage device, disconnecting loads from the energy storage device such that they can no longer obtain the stored energy, or otherwise disrupting the customer's consumption of the energy within the storage device.

In yet another embodiment, the method further comprises providing incentives to the customer to not consume at least one of the first portion of allocated energy or the second portion of allocated energy. Among other methods, incentives may be provided to a customer in the form of payments, credits to an account, increased service priority, gifts, etc.

In yet another embodiment, the method further comprises connecting the energy storage device to the utility network, such as by connecting a mechanical or electrical connection between the device and the network.

In yet another embodiment, the first portion of allocated energy is stored in a division of the energy storage device and is cycled between that division and one or more other divisions of the energy storage device. A division of the energy storage device may be a physical subset, such as a subset of cells in a battery, for example, a portion of a single cell or other energy reservoir that is part of the energy storage device. It may also be represented by a theoretical or mathematical portion of the storage device, e.g., the "last fifteen percent" (or some other percentage) of the total capacity of the storage device before total depletion or the energy remaining in the energy storage after ten days of regular use (or some other time period), or number of uses. The cycling aspect may be embodied by periodically or arbitrarily switching the division that is used from time to time from one defined division to another division of the energy storage device, such as changing the portion of the total number of cells that are allocated to the utility provider from time to time or by configuring the energy storage device in different ways from time to time so that different parts of the energy storage are held in reserve for the utility provider in each case. By cycling the divisions, the overall energy storage device may have extended life due to more even charge/discharge patterns across multiple portions of the device.

In yet another embodiment, the first portion of allocated energy is allocated from an energy storage device operated by the customer. Here, the customer operates the energy storage device, meaning the customer has ownership, possession, control, or some other interest in operating the energy storage device. It may also mean that the energy storage device can be connected, disconnected, charged, discharged, reallocated, or otherwise control access to or prevent others from accessing the device.

In yet another embodiment, the second portion of allocated energy is allocated from an energy storage device operated by a party other than the customer. In this case, a party other than the customer, such as the utility provider or a third party, has ownership, possession, control, or some other interest in operating the energy storage device. This party may have the authority and ability to connect, disconnect, charge, discharge, reallocate, or otherwise control access to the energy storage device. In some embodiments, the third party may work as an agent of or under the direction of the utility provider, but in other cases, the third party operates independently in allocating energy in the energy storage device between the utility provider and the customer and in dealing with those parties without their direction. For example, an energy storage device operator may have an energy storage device and he allocates a portion of energy in it to a utility provider for discharge to the utility network, another portion of energy allocated for the benefit of the customer, and the remainder of energy allocated for his own benefit.

In yet another embodiment, the method further comprises compensating the customer for allocating the first portion of energy stored. This may mean that the customer is compensated (e.g., paid, credited, or otherwise given special treatment or benefits) by a utility provider or another party for allocating a portion of energy storage for the benefit of the utility provider.

In yet another embodiment, the method further comprises compensating a party other than the customer for allocating the second portion of energy for the customer. For example, the performer of this step, such as the customer, may compensate a utility provider or other party for allocating energy to the customer.

In yet another embodiment, the energy storage device is part of one of (a) a backup power source, (b) a power management system, (c) a load leveling device, and (d) a peak mitigation device. These devices and other similar devices use energy storage to augment the power provided by a utility network, distribution grid, secondary or local energy generation, so the energy storage devices that are part of these other devices may be used as the energy storage devices of this method of the invention.

In yet another embodiment the benefit to the utility provider in the method includes demand reduction in the utility network. Demand reduction may be beneficial to the utility provider, particularly during times of unusually high demand, because it reduces strain on components of the utility network. By dispatching energy from the energy storage device to the grid according to methods of the invention, demand reduction may be produced. As a result, the allocation of energy for the benefit of the utility provider, when dispatched into the utility network, may be used as a reserve of energy for demand response. The customer may participate in the demand response program by allocating energy storage that could otherwise go unused in addition to or instead of eliminating consumption altogether during a demand response action.

In other embodiments, a method is provided comprising receiving part of a first portion of allocated energy that has been dispatched into a utility network from an energy storage device, the first portion of allocated energy having been allocated for the benefit of a utility provider and having been stored in the energy storage device with a second portion of energy allocated for the benefit of a customer. The first portion of allocated energy may be considered to be received into the utility network when a sensor or meter registers the flow of energy into the utility network from the energy storage device, or the presence of excess available energy, as a result of the dispatching of energy from the energy storage device wherein the energy was allocated for the benefit of the utility provider with energy that was allocated for the benefit of a customer. For example, this step may be completed when utility energy storage devices are recharged by the dispatched allocated energy or when a power usage meter that is linked to the energy storage device shows a reduction in consumption due to the dispatch of allocated energy.

In some embodiments of this method, the first portion of allocated energy has been dispatched into the utility network at the discretion of the utility provider.

In some other embodiments of this method, the dispatched allocated energy supplements another energy source in the utility network. For example, the dispatched energy may increase the total available energy in the utility network that is otherwise provided by power plants and other grid-connected energy sources. This may incidentally cause demand reduction in the utility network.

The invention may also be embodied as an apparatus comprising means for allocating energy stored in an energy storage device between a utility provider and a customer, wherein the utility provider receives a benefit as a result of a portion of the allocated energy being dispatched to a utility network, and means for actuating a dispatch of energy allocated to the utility provider in the energy storage device to the utility network.

The apparatus may further comprise means for preventing the customer from consuming a portion of energy allocated to the utility provider.

The apparatus may actuate a dispatch of energy by connecting the energy storage device to the utility network. The apparatus may also actuate a dispatch of energy by transmitting a notification.

The invention may also be embodied as a propagated signal comprising a component representing instructions to dispatch a first portion of energy from an energy storage device to a utility network, in which energy storage device the first portion of the energy stored is allocated for the benefit of a utility provider, which benefit is gained by the utility provider as a result of a part of the first portion of the allocated energy being dispatched into the utility network, and in which energy storage device a second portion of the energy stored is allocated for the benefit of the customer. The signal may be propagated through a communications network, such as, for example, the Internet or an intranet, telephonic or cellular communications, satellite transmission, BLUETOOTH® or ZIGBEE® signal, wi-fi signal, other electromagnetic transmissions, visual or optical transmissions, infrared signals, and other means for communicating data.

In some embodiments, the utility allocates a portion of energy in an energy storage device for the purpose of discharging or dispatching the energy into the grid. The utility may also reserve energy for discharging to the grid on a rotational or cyclical basis that may include many customers' energy storage devices. The customer may turn over a portion of his energy stored to the utility provider to be used at the utility provider's discretion, and the utility provider may then give incentives or compensation to the customer for the offering. The utility provider may elect to pay the customer for the ability to call upon the reserved or allocated energy in storage for discharging to the utility network or distribution grid, and the payment may be a flat payment or proportional to the actual energy provided by the customer and/or used by the utility provider. A power management or energy storage system may be sold, rented, or leased to the customer with an attached right for the utility provider to call upon energy stored therein for discharging for its own purposes. Some embodiments involve modifying a power management system or energy storage device to prevent a customer from accessing a utility-reserved portion of the energy, or to allow the utility provider to independently access or control discharge of the energy to the utility network.

In some embodiments customers have the ability to access and use energy that is reserved by or allocated to the utility provider, but the utility provider may charge the customer if the utility-reserved energy allotment is consumed. Alternatively, the utility provider may pay the customer for not using the allocated energy, and if the customer uses some of the energy during a time period, the payment to the customer is reduced or eliminated.

In some embodiments, the utility provider or customer is notified when the other party accesses the utility-allocated portion of the stored energy. The notification may be a notification signal sent to a computer or other means for displaying and/or storing information, a visual indicator, audible signal, or other detectable Also, some embodiments provide that the utility provider may compensate the customer for the costs of recharging the utility-allocated energy storage portion, such as reducing the customer's electricity bill or crediting the customer's account.

Additional and alternative features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features.

FIG. 5 is a diagram of a network of energy storage and control items connected to a utility network.

DETAILED DESCRIPTION

A. General Definitions and Information

Figure 1:
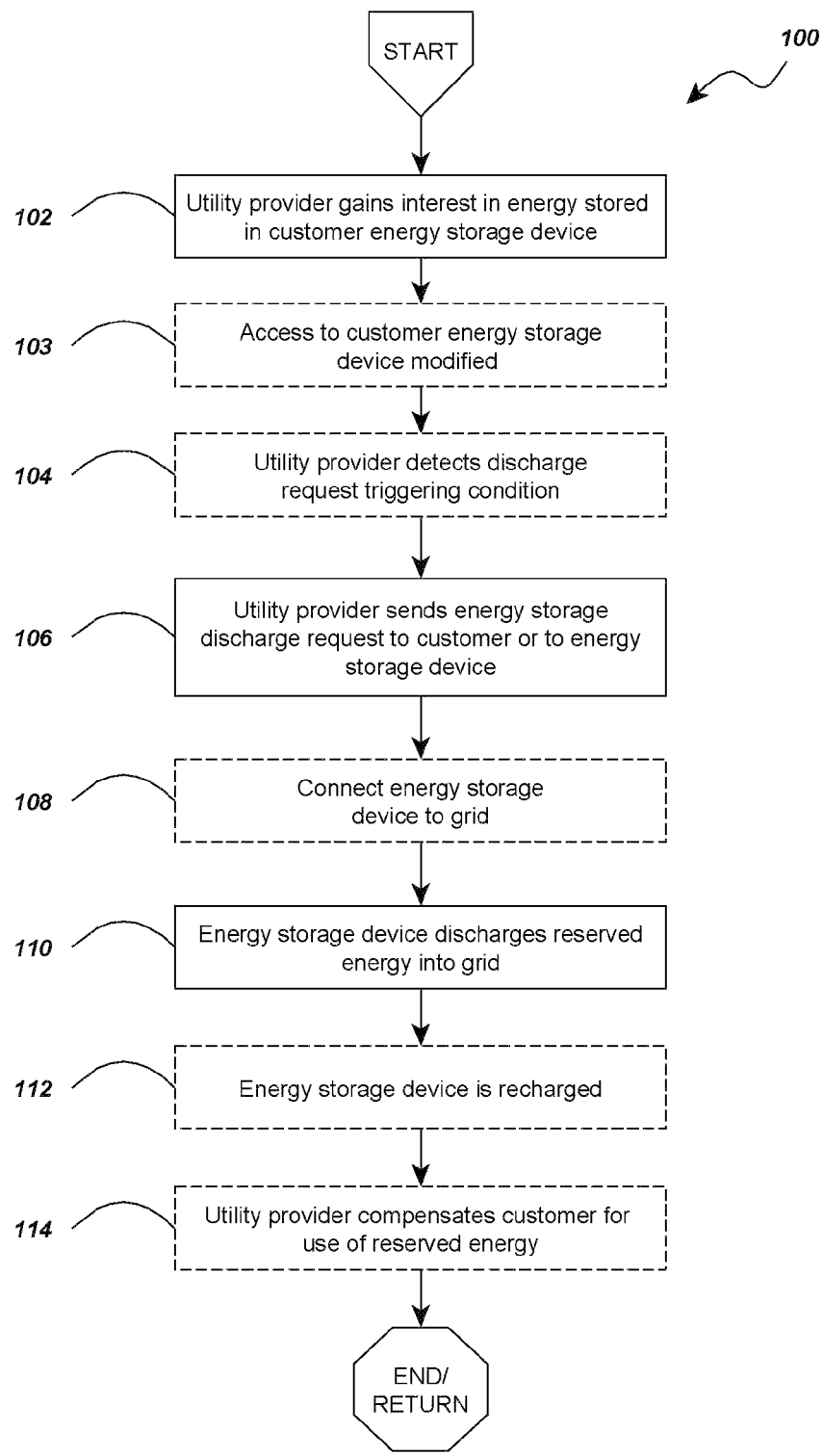
FIG. 1 is a flowchart showing steps of a process where the utility provider reserves energy in a customer's energy storage device and that energy is discharged into the grid.

Generally speaking, a utility provider in the embodiments herein may include a utility company such as an electricity producing or distributing company operating a utility distribution grid that transfers electrical energy from a generating means to customers for electricity consumption. The utility distribution grid may be comprised of various generation and transmission resources, such as, for example, power plants, feeders, substations, transformers, power lines, etc. In some embodiments a utility provider may be a water company managing a water distribution network (which may be referred to as a distribution grid) where water is directed and used in a process to produce electrical energy. A customer of the utility provider is an entity such as a person, household, structure, corporation, or business receiving or consuming energy directly from the utility distribution grid, but a customer may also be another utility provider which consumes the energy by transferring it to customers of its own.

An energy storage device according to the embodiments of the invention may include apparatus such as electrochemical batteries, compressed gas storage, pumped hydro storage, flywheel energy storage, capacitive energy storage, superconductive magnetic energy storage, fuel cell energy storage, combinations thereof, and other similar devices for energy storage known in the art. If the energy storage device includes a battery, the battery types may include rechargeable or non-rechargeable chemistries and compositions, such as, for example, lead-acid, alkaline, secondary lead acid, lithium-ion, sodium (zebra), nickel-metal hydride, nickel cadmium, combinations thereof, and other energy storage chemistries known in the art. The energy storage devices may be comprised of small or large numbers of cells, capacities, voltages, amperages, and other battery properties. They may be configured in unitary or modular designs and may follow standardized guidelines or customized specifications. In some embodiments, the energy storage devices may include generators with a fuel as an energy source, such as fuels including gasoline, propane, butane, oils, diesel, and other petrochemicals, biodiesel, firewood, coal, natural gas, and other energy-producing fuel sources used in electrical generators and power plants. Energy storage devices may also comprise combinations of these various examples, such as an energy storage device where energy is stored in a battery and in biodiesel fuel linked to a generator wherein each source may deliver electricity on demand. For the purposes of this application, when a generator or other fuel-based energy storage device is used, the fuels that are stored for use in a generator are considered to be energy stored in the energy storage device even if the fuels are not physically held within the housing of the generator. For example, the fuels may be in the energy storage device if they are available for consumption by the generator within a reasonable time when electricity generation is needed by a party to which the energy storage is allocated. Such fuel storage methods may include a fuel tank outside of a building where a generator is located, or a fuel depository that may be transported or hauled in a vehicle to the generator when generation is needed.

The energy storage devices may preferably be integrated with or connected to power management systems, such as those used for peak mitigation, load leveling, or backup or uninterruptible power supplies, since they may conveniently provide the electronic equipment needed to connect an energy storage device to the distribution grid. However, energy storage devices that serve other purposes may be utilized when the necessary connecting equipment is used. Such connecting equipment may comprise power converters for changing voltage signals, inverters for changing AC signals to DC signals (or vice versa), power controllers for directing the operation of the power converters, signal conditioning electronics such as stabilizing capacitors, cables, connectors, and other items required to efficiently and safely bring the stored energy to the distribution grid.

Some embodiments of the invention refer to the utility provider gaining an interest in energy reserved in an energy storage device owned, held, or operated by a customer. Other embodiments may refer to energy being allocated to a party. In these embodiments a utility provider may enter a contract, license, or other agreement wherein the utility provider has an interest such as an expectation interest in the energy reserved. For example, the utility provider may enter an agreement with the customer such that the customer is obligated to keep a certain number of kilowatt-hours of energy storage allocated and available for utility provider usage at all times. In other embodiments the customer may agree to keep a predetermined percentage of overall energy capacity in the energy storage device prepared for utility provider disposal. In these examples, the utility provider has the equivalent of an ownership interest in some portion of the energy that the customer stores, but a lesser interest may also be granted. For instance, the customer may contract with the utility provider to give access rights. In this case, the customer would be permitted to operate normally, with access to all energy in the energy storage device, but will give the utility provider temporary access to a portion or all of the energy stored once the utility provider gives notice of a need for additional energy. The energy accessible by the utility provider after giving notice to the customer would not be specifically reserved for the utility's use otherwise.

The energy accessed by the utility provider may be held in cells, modules, or other compartments of the energy storage device that are set apart or singled out under the utility provider reservation or allocation arrangement. Thus the reserved energy storage portion may be static, meaning the same portion is consistently kept charged for utility provider access, but it may also be dynamic, meaning the portion that is kept charged for utility provider access may rotate among multiple available energy storage portions. A static energy storage program may offer the benefit of predictability for the utility provider, as the utility provider may install measurement equipment on the reserved portion in order to keep track of its status. Otherwise, the utility provider may have to install such measuring equipment on all portions of the energy storage to get an accurate perspective on the current state of the reserved energy. If this is not a serious concern, a dynamic storage program may be preferable because it may allow the customer's energy storage to achieve longer life. Dynamically changing reserve portions may be subjected to fewer discharge cycles on average if the relatively underused utility provider-reserved portion is rotated through available storage.

The utility provider may directly control the discharge and/or charge of the energy storage device of the customer, but may also have others implement these actions. If the utility provider directly controls the discharge or charge of the energy storage, a means for implementing those actions may be installed at the energy storage site, such as a computer or controller connected to the energy storage that may be given instructions at the site by an operator or may be given instructions remotely via a computer network connection. In either case, the energy storage is manipulated by the utility provider having an interest in an allocated or reserved portion of the energy stored therein. A controller or computer in these embodiments may access the reserved energy portions alone, or may be given access to the whole energy storage, including any non-reserved portions, as may need to be the case when dealing with a dynamic storage program as outlined above. If the utility provider is not given direct control, a customer or third party may be responsible for implementing the charge or discharge wishes of the utility provider. In this case the utility provider may still have measurement equipment connected to the energy storage device to allow it to track available reserved energy, but it would rely on the other party to implement charging and discharging decisions. In yet other embodiments, the energy storage device is not permanently connected to the distribution grid, so the utility provider may have a geographic tracking means installed on the energy storage such as a global positioning satellite (GPS) or radio-based locator in order to determine which portions of the distribution grid may be affected by a charge or discharge from that unit. A semi-permanent installation of an energy storage device is also possible, where the energy storage is not particularly mobile or portable but may still be connected and disconnected from the distribution grid when desired. Thus, the utility provider, customer, or third party may have to physically or electronically establish the connections to the grid before a charge or discharge can take place.

B. Description of Selected Embodiments

The preferred embodiments described herein may improve demand response program participation by introducing energy storage to the grid that may be called upon at a given time by the utility provider to counteract rises in demand in a location. Demand response activation rates may also be improved, as the utility provider may have more flexibility in determining which customers are to participate in demand response, how much they are to participate, and when they are to discharge energy into the distribution grid. In some embodiments grid infrastructure costs may be decreased as customers may bear the burden of purchasing, installing, and maintaining power management systems and energy storage devices at their locations, and their existing energy assets are also used more prudently and efficiently since energy storage that may go to waste is put to use or is compensated for by a utility provider.

Referring now to the figures in detail, FIG. 1 is a flowchart showing steps of a process 100 according to an embodiment of the invention where the utility provider gains interest in energy in a customer's energy storage device and that energy is discharged into the grid. The utility provider gains an interest in energy stored in a customer energy storage device in step 102. This step may be performed according to the methods of gaining an interest (static, dynamic, etc.) that are described above in this specification.

In some embodiments, step 103 is performed, where access to the customer energy storage device is modified. The modifications of this step are made to enable the energy storage to (a) connect to the grid or utility network, (b) receive commands and other propagated signals from a utility provider, customer, or third party, (c) implement commands and other instructions from those entities, (d) sense data in the grid, energy storage device, or customer's site, (e) send data to the utility provider, customer, or third party, or (f) combinations of these abilities. The modifications may include, for example, installing grid-tie electronics, power converters, voltmeters, ammeters, consumption meters, measurement equipment and other sensors, cables, wires, connectors, plugs, housings, switches, cases, displays, antennae, transceivers, controllers, computers, and communication devices to the energy storage and its associated electrical systems. The extensiveness of the modifications to the energy storage may vary in each implementation of the method 100.

In some embodiments, step 104 is performed, where the utility provider detects a discharge request triggering condition. A triggering condition may be related to demand response programs by measuring elevated demand, reaching predetermined temperatures in distribution grid equipment or energy storage devices, increased consumption by the customer, depletion of the utility's demand response resources, a predetermined time of day, month, or year, or any other indicator that would notify the utility that it may need additional, supplemental energy in the distribution network as a whole or in the locality of the customer. The triggering conditions may be measured by sensors connected to the customer's energy storage device, but may also be linked to external sensors, such as meters placed at transformers and substations that serve the area affected by a discharge of the energy storage device of the customer. Detection of a triggering condition may be due to manual or automated or computerized measurement taking. Other triggering conditions may be arbitrary or irregular in nature, such as in the case of testing the discharge request system, emergency response such as in cases of natural disaster, or the result of random request system conditioning or maintenance.

In step 106 the utility provider sends an energy storage discharge request to the customer or to the customer's energy storage device. A discharge request in this step may include information regarding the discharge obligation of the customer or the energy storage device, the time to start discharging, the duration, rate, voltage, or other properties of the energy to be discharged, and what energy storage resources to discharge. Information about possible compensation for enacting the discharge request and other financial and electrical information related to a discharge event may be included as well. The discharge request may be sent by a network connection, telephone message, SMS or other text message, cellular signal, satellite transmission, email, word of mouth, postal mail, personal service of documents, computer signal, electrical signal, optical signal, laser transmission, microwave transmission, radio or other electromagnetic transmission, other means of delivering information from the utility provider that may be received and acted upon by the customer or a controller of the energy storage device of the customer, and combinations thereof. The discharge request may be sent to one or multiple recipients having energy storage devices across many portions of the distribution grid if desired. In a preferable embodiment, the discharge request is sent to all participating customers and/or energy storage devices simultaneously in order to obtain widespread reduction in demand with the least amount of energy burden per customer.

As discussed in conjunction with the following figures, customers may choose whether or not to act on the discharge request when it is sent, but for the purposes of the process outlined in FIG. 1, the customer is obligated to provide the requested energy that is reserved by the utility in conjunction with step 102. It may be advantageous to establish in advance the contours of what is required of the customer or the energy storage device when a discharge request is submitted so that both parties understand the expectations and requirements of those involved. Because network connections and communications between the customer and the utility provider can be unreliable, a discharge request may include instructions regarding how to operate in case of a loss of communication between the utility provider and the customer, or may include a schedule of discharge requests where the customer energy storage device is requested to discharge at prearranged intervals that are not dependent on communication between the utility provider and the energy storage. For example, this arrangement may be made in conjunction with the execution of step 102. As a side note, if step 104 is not performed as part of the method 100, a utility provider does not detect a demand response triggering condition. This shows that the utility provider is not required to detect a demand response triggering condition, and may simply elect to issue a discharge request in step 106 at will or under its own discretion.

If the energy storage device has not been connected to the grid, it is connected at step 108. Some energy storage devices are designed to store energy without being connected to the grid, such as through solar energy or water collection, and through this step, those devices are linked to the grid so that they may discharge in response to the discharge request. For example, this step may be performed by establishing an electrical connection from the energy storage to the grid, by enabling communication between the energy storage device controller and the utility provider such that a discharge event is made possible, or by simply plugging the energy storage into a grid-tied utility network interface panel. Modifications made in step 103 may make it possible for this connection to take place.

The energy storage device discharges reserved energy into the grid at step 110. This includes at minimum an enactment of some portion of the energy storage discharge request of step 106. Some of the energy that is reserved by the utility provider is dispensed to the grid, producing a slowing, reduction, or reversal of the energy consumption of the customer's location. As this step is performed, the utility provider, customer, or third party may observe the characteristics of the energy storage device, equipment connecting it to the grid, and general demand and consumption conditions in the grid affected by the discharge in order to determine whether the energy discharged has the desired effect. For example, as a result of this monitoring, an updated discharge request may be issued to lengthen or shorten the discharge event, change the rate of discharge, or adjust other parameters propagated to the customer or customer's energy storage device. In some embodiments, the energy storage device is under the direct control of the utility provider during step 110, and these adjustments may be made in real-time as a discharge request is implemented without needing to deliver a new discharge request for adjustments. Once the discharge action concludes, the utility provider, customer, or third party may collect information from the controller or energy storage device regarding remaining energy, operating conditions of the device, how much energy was dispensed, whether the connection to the grid was interrupted during the discharge action, etc.

Because the energy storage device has discharged some energy in step 110, in some embodiments the energy storage device is recharged at step 112. The energy storage may be recharged by a connection to the distribution grid, a renewable energy source such as solar or wind generation, a non-renewable energy source such as a generator, another energy storage device, or similar energy source. The energy storage device may be recharged to at least partially refill the reserved capacity for the utility provider, or may be recharged to more than the reserve capacity if non-reserve energy is depleted as well. The rate and duration of recharging in this step may be determined by the charging equipment connected to the energy storage device and the power available from the grid or other energy source at the time of recharging. For example, the recharging process may be restricted or delayed due to high demand conditions that would lead to instability in the grid, exceeding a consumption threshold that would result in a demand charge billed by the utility provider, or because vital equipment at the customer site would be in jeopardy of having power shut off due to excess power draw from renewable resources or the distribution grid.

Step 114 shows that the utility provider may compensate the customer for use of the reserved energy. For example, in some embodiments this step may be directly related to the energy discharged in step 110, where the customer is compensated by the watt-hours provided to the distribution grid in step 110. In other embodiments a tiered compensation basis may be used, where the customer is given a certain level of compensation for providing a first range of energy in step 110, and another level of compensation for providing a second level. Under this scenario, it may be that the customer is not compensated if there is no discharge of energy in step 110, but there is a flat payment when the utility provider receives any positive discharge amount at that time. Methods of compensation may include direct payment to the customer, indirect payment such as gift certificates or gift cards, a credit to the customer's utility bill, a discount in services provided, preferential access to utility equipment, upgrades to the customer's service or grid connection, donations made by the utility provider on the customer's behalf to charities or other organizations, access to lobbyists, upgrades to energy storage devices used by the customer, energy storage device or power management unit rental or leasing discounts or financing options for the customer, or other pecuniary or equitable advantages or benefits conferred as a result of the customer's response to a discharge request. A simple repayment or credit for the cost of recharging the reserved energy portion after a discharging event may be all that is required in some embodiments. This action may also be used by the utility provider as a means of collecting bill payments, paying for infrastructure upgrades, and adapting to increased energy prices, as the customer may be paid less than the normal cost of the energy used to recharge the energy storage device.

After steps 110, 112, and/or 114 are completed, the process 100 may end or may return to the start or a previous step. Returning to the start or to a previous step may not be required in all embodiments, but may be advantageous in allowing execution of additional discharge requests and energy storage device discharges. In embodiments where the process 100 is executed in conjunction with a demand response program, the additional discharge requests and device discharges, among the other steps, may be particularly useful since demand may tend to fluctuate above and below a demand threshold that the process may help the utility provider from exceeding on a regular basis. If the process 100 returns to a previous step, a logical step to resume operation may be step 102, where the utility provider gains interest in more energy stored in the energy storage device, or steps 104 or 106, where a new discharge request is triggered and created.

The steps of this method 100 may be performed interchangeably or in an alternative order when circumstances permit. For example, the utility provider may compensate the customer as in step 114 before the energy storage device is recharged as in step 112, or the energy storage device may be connected to the grid as in step 108 before a discharge request is sent as in step 106. The order of the steps as presented in FIG. 1 is intended to be representative of a suggested order of execution and not a restriction on the implementation of the process illustrated. The dashed boxes as shown in this method 100 indicate that some or all steps with dashed lines are omitted completely in some embodiments.

Figure 2:
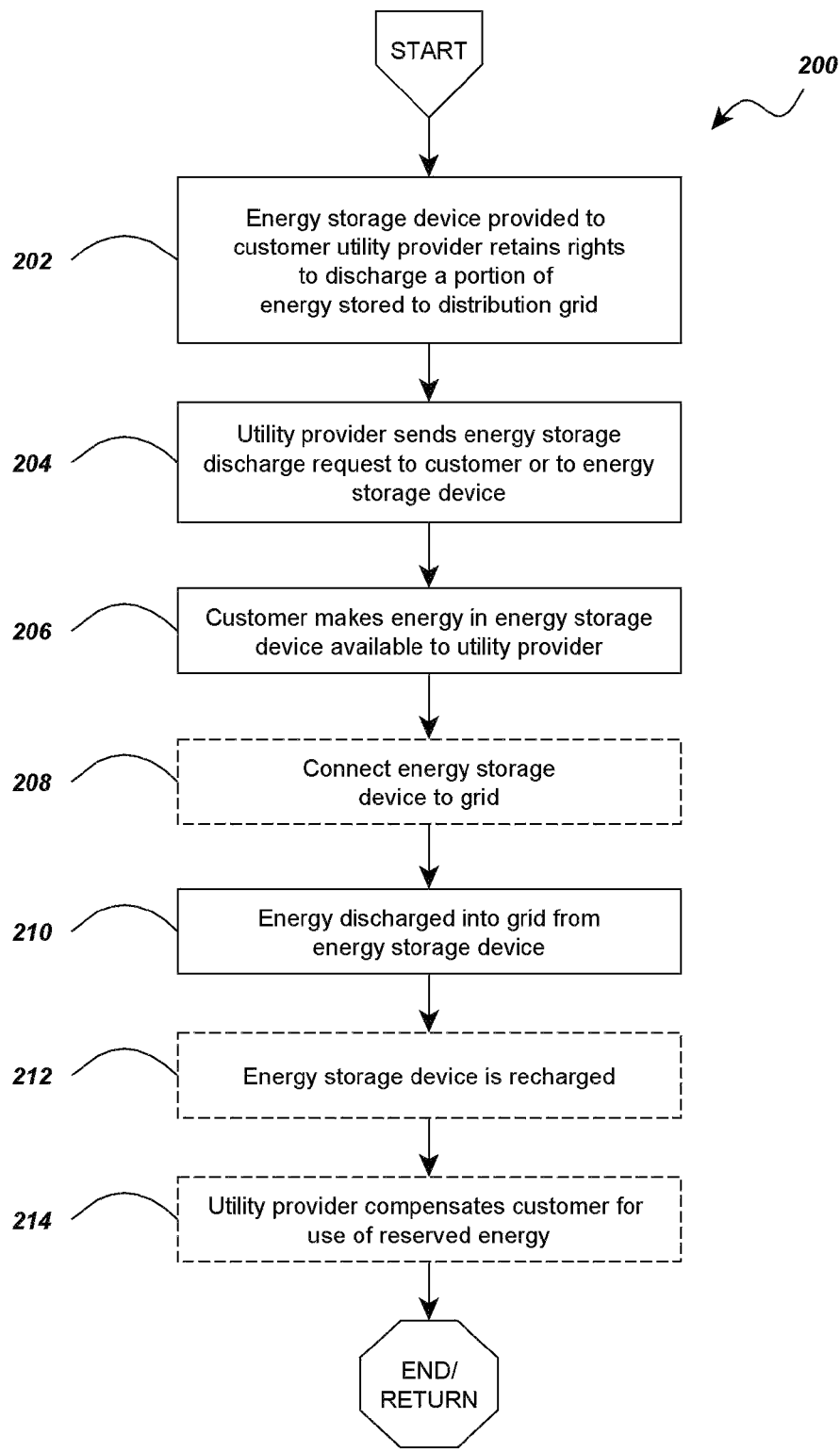
FIG. 2 is a flowchart of a method for distributing a power management system or energy storage device to a customer wherein a utility provider retains rights to discharge a portion of energy stored into the grid.

FIG. 2 is a flowchart of a method 200 for distributing a power management system or energy storage device to a customer. The method 200 includes a step 202 where a power management system (which may include an energy storage device) and/or a standalone energy storage device is provided to a customer under an agreement or license with the utility provider that allows the utility provider to retain the right to discharge or dispense some amount of energy from the energy storage device held by the customer into the grid at the utility provider's discretion. The act of providing the energy storage device to the customer may be fulfilled by a sale of the energy storage device or a modification to an energy storage device wherein the energy storage device is rendered (a) connectable to the grid, (b) accessible to the utility provider, (c) able to track and/or store or transmit usage, discharge, and consumption by the energy storage device, and/or (d) capable of keeping energy reserved for utility provider discharge requests under an agreement that allows the utility provider to (a) access a portion of reserved energy in the energy storage device or (b) retain ownership in a portion of energy storage capacity. In this process 200, the customer receives the energy storage device with the rights of the utility provider either attached in advance or attached at the time the customer purchases or takes possession of the energy storage device or energy that is stored therein. For example, the energy storage device may be sold with rights attached for the utility provider to have access to a portion of the energy stored therein, or the device may be rented by the customer under the condition of allowing utility provider access on request. If the energy storage device may be disconnectable from the grid, the utility provider having an interest in a portion of energy stored in the energy storage device may require the customer to respond to requests for connection to the grid or to allow the utility provider or a third party to restore a connection to the grid. In some embodiments, the customer may lose privileges or be penalized or fined for noncompliance or disrupting the operation of the energy storage device when the utility provider may need access.

Step 204 shows that a utility provider may send an energy storage discharge request to the customer or to the energy storage device when a demand response discharge action must be implemented. This step may be implemented in the same fashion as step 106 described above. Because the utility provider in this process 200 has retained rights to discharge a portion of energy stored in the energy storage device, it may be more likely that the utility provider will have direct access to the discharging function of the device when executing step 204 because it may come with that capability pre-installed or may receive a modification made to the device to allow such behavior before it reaches the customer's possession.

In step 206 the customer makes energy in the energy storage device available to the utility provider. In some embodiments, the completion of this step requires that a portion of the energy stored in the storage device is set aside for utility provider access. This may include cutting off customer access to some of the energy stored so that the utility provider has enough available energy in the device to complete a discharge request. It may also mean restricting discharging of the energy storage for a limited time to allow the energy storage to recharge to a point where the stored energy is sufficient to complete the discharge request, or merely restricting discharging so that whatever portion of energy remains in the device may be used at the utility's discretion. In this way the customer may yield up part of the energy allocated to the utility provider. The yielding may also take place by the customer actively discharging energy to the utility provider as described in connection with step 110.

Step 208 provides that the energy storage device is connected to the distribution grid if it has not been connected at this point in the process 200. In some embodiments, this means the customer acts to facilitate the utility provider's access to the portion of the energy that is reserved in the energy storage device, such as, for example, connecting the energy storage to the distribution grid (e.g., as described in conjunction with step 108 above), opening a network, communications, or electrical connection between the utility provider and a discharge controller of the energy storage, or permitting a utility provider or third party to physically access the energy storage device, to complete the discharge request. The implementation of this step may be completed simultaneously with step 206, such as when the energy storage device needs a connection to the distribution grid before it may recharge enough to have energy available to the utility provider.

At step 210, energy stored is discharged into the grid from the energy storage device. The energy may be provided to the grid to counteract elevated demand in the area of the energy storage device, to provide relief to equipment that is strained due to excessive power flow, to test utility equipment, to test energy storage discharging equipment, or to meet other needs of the utility provider. The amount of energy discharged, the duration of discharge, the voltage, and other characteristics of the energy are determined by the utility provider and sent to the energy storage device controller or may be built into the device or its controller. The execution of this step may be completed under the methods and procedures described in connection with step 110 above as well.

Steps 212 and 214 outline that the energy storage device may be recharged and the utility provider may compensate the customer for the amount of energy used from the reserve, or for the cost of recharging the energy storage device, as described in detail above in association with steps 112 and 114.

The process 200 ends after the completion of steps 210, 212, and/or 214, but it may also return to the start or a previous step, such as step 202 or step 204, and resume operation if necessary. For example, if the energy storage device is rented by the customer, the process may forego returning to step 202 and instead return to step 204 since the energy storage device has already been provided to the customer and repeating step 202 would be unnecessary until the rental period concludes.

The steps of this method 200 may also be performed interchangeably or in an alternative order when circumstances permit. For example, the utility provider may compensate the customer as in step 214 before the energy storage device is recharged as in step 212, or the energy storage device may be connected to the grid as in step 208 before a discharge request is sent as in step 204. The order of the steps presented in FIG. 2 is intended to be representative of a possible order of execution and not a restriction on the implementation of the process illustrated. The dashed boxes as shown in this method 200 indicate that some or all steps with dashed lines may be completely omitted in some embodiments.

Figure 3:
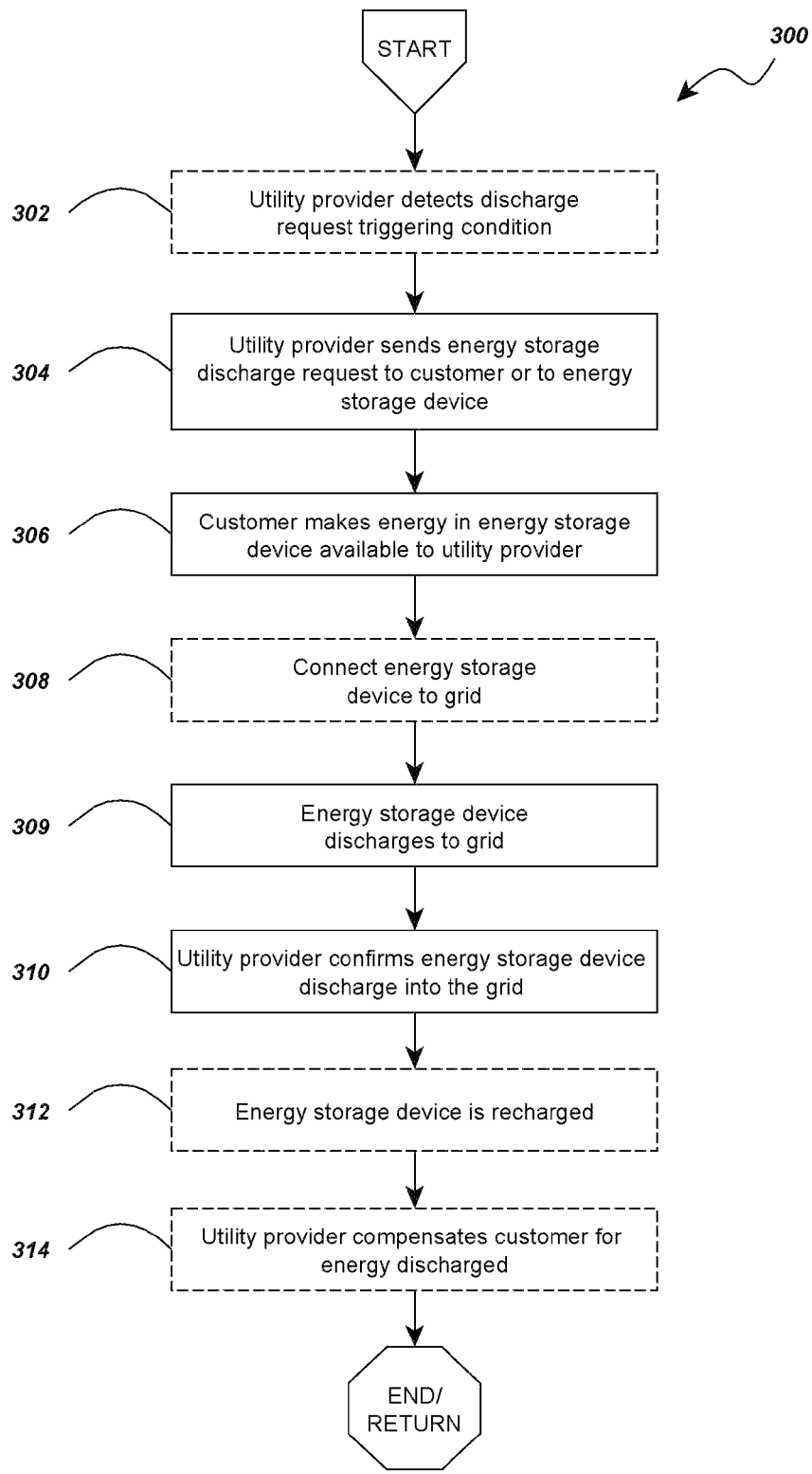
FIG. 3 is a flowchart outlining a method whereby a customer having an energy storage device may leverage the stored energy to discharge into the grid and may be compensated therefor.

FIG. 3 is a flowchart outlining a method 300 whereby a customer having an energy storage device may leverage the stored energy to discharge to the grid without having a prearranged obligation to do so. In some embodiments this method 300 is a program where the customer is not obligated to discharge his energy storage at the utility provider's request, but will gain compensation from the utility provider if he chooses to do so. Unlike other embodiments, this method 300 does not require a grant of rights or reservation of energy for the utility provider. The utility provider may detect a discharge request triggering condition at step 302 and send an energy storage discharge request to the customer or his energy storage device at 304. This non-binding request may be followed up by a customer making energy in his energy storage available for utility provider use or access in step 306, which may include connecting the energy storage device to the grid at step 308. The energy storage device is discharged to the grid at step 309 similar to the procedures described in connection with steps 110 or 210 above.

At step 310, the utility provider confirms that the energy storage device has discharged into the grid. The various ways this step may be implemented include reading power output from an installed power meter at the customer's energy storage device, tracking changes in the customer's consumption during the time period of the energy storage discharge event, reading power output or state of charge of the energy storage from a battery management system or similar controller at the energy storage device, tracking surrounding demand level reductions that result from a discharging event, and other methods of measuring energy discharged. A confirmation of discharge may also be taken directly from the customer or a third party who enacted the discharging event of step 309. This step allows the utility provider to determine whether the customer responded to the energy storage discharge request, and possibly informs him concerning how much energy was provided or gives information concerning the next time a discharge event may be possible from the customer's energy storage device. This information facilitates compensation of the customer for his participation and may ensure that discharge requests are properly spaced out to prevent damage to customer energy storage devices.

Steps 312 and 314 may follow, wherein the energy storage device is recharged and the utility provider compensates the customer for use of the energy discharged in step 309. These steps may be completed using the methods and procedures described above with steps 112, 114, 212, and 214. In these embodiments, however, the compensation of the customer is preferably based on the energy actually discharged into the grid since there is no reservation of the energy by the utility provider in this process 300. For instance, the compensation may be tiered based on the amount of energy discharged, flatly based on whether energy was discharged at all, based on the duration of discharge or time before the customer responded to the request, or other characteristics of the customer's response to the discharge request. Other forms of compensation are also possible, for example, the compensation may be based on signing up to receive discharge requests from the utility provider, and the customer may be thus compensated even though energy may not have been discharged into the utility network at any time.

The steps of this method 300 may also be performed interchangeably or in an alternative order when possible. For example, the utility provider may compensate the customer as in step 314 before the energy storage device is recharged as in step 312, or the energy storage device may be connected to the grid as in step 308 before a discharge request is sent as in step 304. The order of the steps presented in FIG. 3 is intended to be representative of a suggested order of execution and not a restriction on the implementation of the process illustrated. The dashed boxes as shown in this method 300 indicate that some or all steps with dashed lines may be completely omitted in some embodiments.

The process 300 ends after the completion of listed steps, but it may also return to the start or a previous step, such as step 302 or step 306, and resume operation if necessary. In this way, the process may be executed continuously.

It may be beneficial for the utility provider to allow customers who have entered an energy reservation program with a utility to have access to the reserved energy from time to time. This access would permit customers to respond to emergency energy needs at their site and help to ensure that energy assets do not go to unnecessary waste. The utility provider may benefit from this arrangement by collecting fees or billing customers for the usage of the reserved energy, and may therefore enable a utility provider with higher risk tolerance or lower likelihood of producing a discharge request to more efficiently take advantage of provider-reserved energy that might otherwise go to waste.

Figure 4:
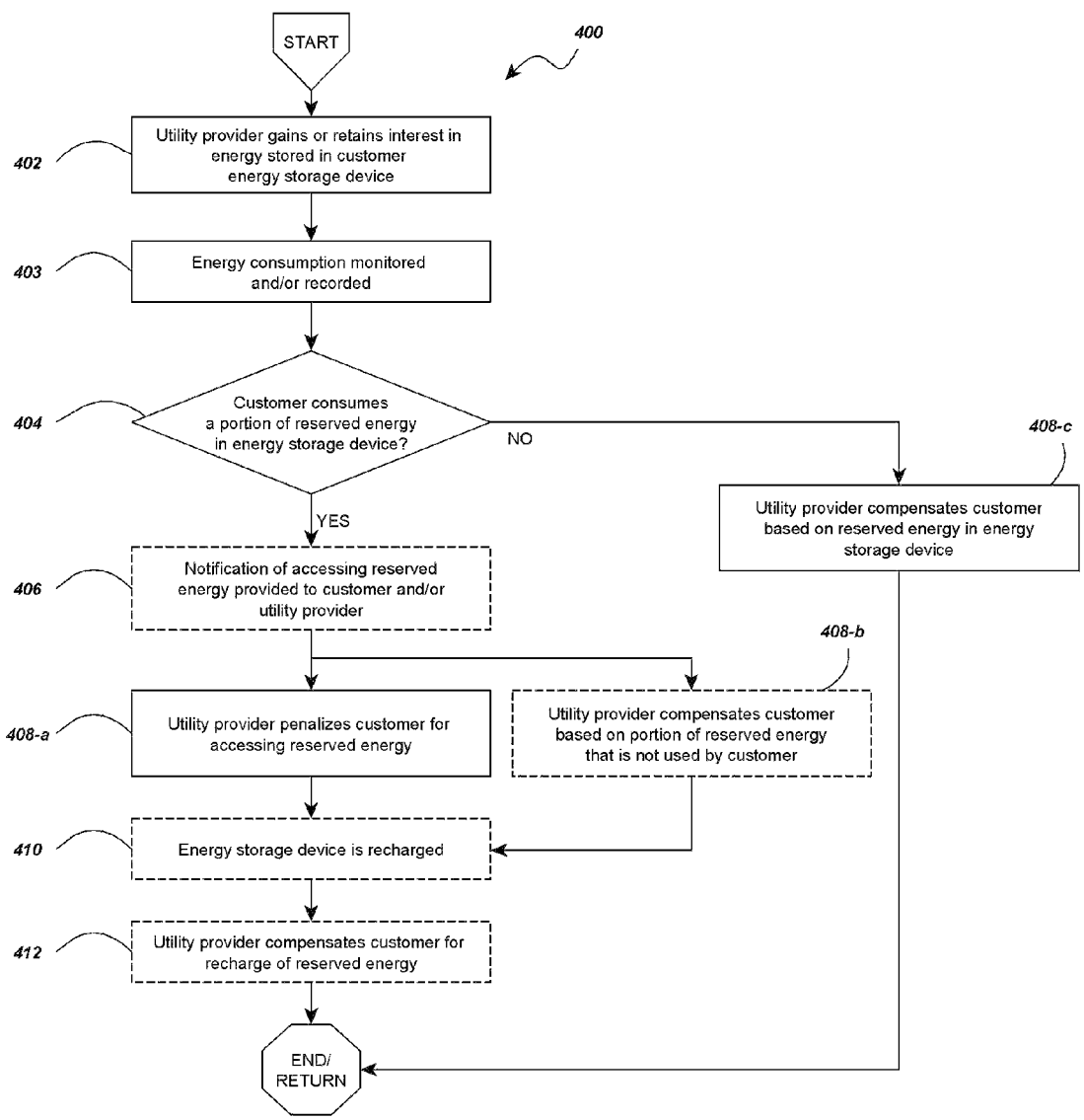
FIG. 4 is a flowchart outlining a method of penalizing, charging, or compensating customers based on their use of energy reserved for a utility provider in an energy storage device.

FIG. 4 is a flowchart outlining a method 400 of penalizing, charging, or compensating customers based on their use of energy reserved for a utility provider in an energy storage device. The method 400 begins with a utility provider gaining or retaining an interest in energy stored in a customer energy storage device, as shown in step 402. This step parallels steps 102 and 202 discussed previously, since the utility provider may gain an interest in energy stored in a customer's energy storage device or may retain an interest in the energy storage at the time it passes to the customer. A certain portion of the energy in the energy storage device is reserved for the utility provider, and the customer operates as normal, using the non-reserved energy storage as he deems necessary.

A monitoring process is maintained that checks to see whether the customer consumes a portion of the reserved energy in the energy storage device as time progresses, as shown by step 403. For example, in some embodiments the monitoring may be performed by sensors, observation, computerized synthesis and/or analysis that gives an overview of the energy stored in the energy storage device and that can derive whether the energy consumed by the customer has been reserved by the utility provider.

Step 404 shows that a check is periodically made as monitoring proceeds to determine whether reserved energy is used. For example, this determination may be reached by examining whether a portion of the reserved energy has been discharged, by examining the discharge or state of charge history of the energy storage device, by deducing that reserved energy has been used based on consumption and demand measurements in or near the customer's site, or by detecting a notification from the energy storage device or its system controller that some reserved energy has been accessed. If reserved energy has been accessed, the next steps are 406, 408-a, and/or 408-b. If the reserved energy is not accessed, the process proceeds to step 408-c.

At step 406, a notification of accessing reserved energy may be provided to the customer and/or the utility provider. This may entail sending a message to the customer and/or utility provider to indicate that the check of 404 has produced an affirmative result, and that the customer may be subject to fees or a reduction in compensation (as indicated in steps 408-a and 408-b) because reserved energy has been appropriated by the customer. This may allow the customer and utility provider to plan their future consumption of the reserved energy based on the reduction. For example, the utility provider may update its database to reflect the reduced capacity of that customer's site in case a demand response request is generated before the energy storage device has time to recharge, or the customer may react to the notification by reducing energy consumed at the site, by recharging the reserved energy, or by accounting for the reduced benefits or penalties that will result because he accessed the energy in which the utility provider has an interest. This step is shown with a dashed box to reflect that the notification is only present in some embodiments of process 400.

Step 408 is divided into three potential steps that depend on the demand response program in which the utility provider and the customer participate. Step 408-a provides that if the check of step 404 is affirmative, the utility provider may penalize the customer for accessing reserved energy. For example, the penalties in step 408-a may include an additional charge to the customer such as an additional fee on the customer's utility bill, a limitation on the nature or quality of the utility service to the customer, a restriction of customer access to the reserved energy, an adjustment to the nature of the portion of energy reserved, an adjustment in the energy storage device rental agreement between the customer and utility provider, an elimination of all benefits conferred to the customer, and other such penalties as the utility provider desires. Alternatively, step 408-b may be implemented, where previously agreed-upon benefits for the customer for participation in the energy storage reservation program are reduced or limited. For instance, if the customer expects a payment or credit to his account for participating in the energy reservation program, the utility provider may reduce the payment based on the amount of reserved energy appropriated by the customer during the billing period but still compensate the customer for the amount of compliance he had provided. Step 408-b is shown in FIG. 4 with dashed lines to indicate that it is an alternative embodiment from 408-a, though both steps could be performed in series or in parallel in other embodiments since they both reflect an assessment against the customer based on the customer's consumption of reserved energy. For instance, penalties such as those of step 408-a and reductions or limits of step 408-b may both be imposed against a customer in some embodiments.

If the customer does not consume reserved energy, step 408-c is performed, where the utility provider compensates or credits the customer based on the reserved energy in the energy storage device without deviation from their original compensation agreement. The process 400 may conclude after completing this step, or may return to step 404 at the start of a new monitoring or observation period at step 403.

Step 410 may be performed if the energy storage device is rechargeable, whereby the energy storage device is recharged. This step may follow procedures described in connection with steps 112, 212, or 312.

Step 412 may be implemented to compensate the customer for the recharging of reserved energy. The cost of recharging the energy reserve may therefore be reduced from the penalties incurred in step 408-a or the compensation reduction of step 408-b. This may prevent the utility provider from double-dipping charges to the customer for discharging the reserved energy storage. It is advantageous, however, to ensure that the penalty or compensation reduction of steps 408-a and 408-b has greater magnitude than the compensation at step 412 for recharging the energy storage in order to deter waste of the utility provider's contracted energy reserve. This step 412, along with step 410, are only present in some embodiments, as described above in connection with steps 112, 114, 212, 214, 312, and 314.

Continuous operation of the methods disclosed in this specification may be possible as several embodiments may return and rerun steps after the final listed steps are performed. However, returning to a previous step is to be considered a new instance of the method being conducted insofar as a sufficient portion of the steps are retraced. In the case of process 100, this means tracing back to step 106 or earlier. In process 200, this means returning to step 206 or earlier. For process 300, this means returning to step 306 or earlier in the process. In process 400, step 404 or earlier should be the point of return.

The methods and processes of the present invention may be implemented or performed using a non-transitory computer-readable storage medium having fixed therein a sequence of instructions which, when executed by a computer, direct the performance of a method. A computer for executing these methods and processes may comprise a memory and a processor for executing instructions provided. Thus the methods and processes of the invention may be embodied in a computer software product.

FIG. 5 is a diagram showing power management devices connected to a utility network that may be used in allocating and distributing energy between two parties. An energy storage device 500 in this figure is shown as a component part of a power management system 502. The energy storage device 500 may comprise one or more batteries, flywheel storage devices, compressed gas storage tanks, pumped hydro storage devices, fuel cells, and other devices, as mentioned previously in this specification. The storage device 500 may operate as part of a power management system 502, may operate without power management system 502 components, or both. In an exemplary embodiment, the state of charge (SOC) of the energy storage device 500 may be determined by taking measurements from the device. The power management system 502 may add a power management controller, additional energy storage devices, and renewable or nonrenewable generation devices to the energy storage device 500 in order to facilitate peak mitigation, load leveling, load shedding, backup power provision, and other power management measures. The energy storage device 500 may be used as part of the power management system 502 or may only be connected as a backup source for power management. The power management system 502 does not need to physically house the energy storage device 500, despite the appearance of the two devices in the figure. Furthermore, the power management system's components may be distributed to different areas, such as, for example, a power generating windmill that is outside the structure where a power management controller is located, and another energy storage device may be located in a trailer down the road from the structure. The shapes indicated in the figure are not intended to restrict the size and shape of the components they represent, but to show functional relationships and networks between the components.

The energy storage device 500 is connected to a system controller 504 in the figure. The energy store 500 may alternatively be connected to the power management system 502, which may then be connected to the system controller 504 (as shown by the dashed line between the two). A system controller 504 as shown here may differ from the power management system controller mentioned in connection with power management controller 502, but the two could be part of the same device in other embodiments. A primary function of the system controller 504 is to manage the charge and discharge actions of at least a portion of the energy storage device 500, and it may be configured to dynamically allocate energy in the storage device 500, condition the energy storage device 500, take measurements such as the SOC, current, or voltage of the energy storage 500, and perform other operational and maintenance actions. The system controller 504 may be embodied as a computer enabled to execute code, software, or other instructions, a hard-coded circuit or chip, or a mechanical device, so far as it is capable of allocating energy in the energy storage device and dispatching the allocated energy to the utility network (e.g., 508).

In these embodiments, the system controller 504 may allocate energy of the energy storage device physically, electrically, or virtually. The system controller 504 allocates energy physically by adjusting a physical connection, wire, barrier, or other limiting device physically linked to the energy storage device to separate the allocated portions of energy from each other and to enable utility providers, customers, and other parties to have access to their appropriate reserved energy portions. For example, individual battery cells that are allocated to the customer may be moved into containers or areas that are separate from cells allocated to the utility provider. Exemplary forms of electrical allocation may include opening and closing circuit elements, activating electrical circuit breakers, or activating switches or transistors in such a manner that the different portions of allocated energy remain identified and appropriately accessible by each party in the same circuit. For example, in the case of battery cells, the proportion of customer-allocated cells to utility-provider-allocated cells may be related to a measurement of a variable resistor or the status of various switches connected to the battery. Virtual allocation may include managing the amount of allocation for each interested party by keeping separate charge and discharge ability or authorization of the energy storage device for the customer and utility provider in a database, computer file, data storage medium, or other information repository, and then preventing parties from using or accessing energy beyond the amount of energy allocated for their use. For example, a customer may be given an authorization code that permits the customer to discharge 80% of the total stored charge in a battery, and the utility provider may be given a code that permits the discharge of the remaining 20%, and each party is able to access the system controller to effectuate a discharge totaling their respective portions.

The system controller 504 is shown connected to the utility network interface 506. The power management system 502 may alternatively also be connected to the network interface 506, or the network interface 506 may be integrated with the power management system 502 or controller 504 in some embodiments. The utility network interface 506 may be embodied as an electrical service panel through which the electrical systems of the site are connected to the electrical distribution grid, a grid-tied inverter, or other means capable of safely connecting electronic equipment to the utility network 508. Preferably, the network interface 506 allows bi-directional transfer of energy between the network 508 and the controller 504 or energy storage device 500 in order to maintain charge and discharge capability of the energy storage 500. The network interface 506 may accommodate multiple electrical load connections in addition to the system controller 504 or power management system 502, or it may consist of a single connection acting as a control feature for such an embodiment by allowing ready identification of the connection point of the energy storage device 500 to the utility network 508 for reasons such as emergency connection or disconnection of the storage device 500 with the utility network 508.

The utility network interface 506 is shown connected to the utility network 508. The interface 506 may be permanently or semi-permanently connected to the utility network 508, or it may be temporarily connectable and disconnectable. For example, in some embodiments the energy storage device 500 and system controller 504 may be loaded into a mobile apparatus that only needs temporary access to the utility network 508. The utility network 508 itself may consist of an electrical distribution grid, electricity transmission cables, towers, poles, transformers, substations, power plants, renewable and nonrenewable generation devices, other customer sites, loads, control centers, mobile generation and storage, and like electrical distribution, supply, and consumption equipment. Alternatively, an analogous water distribution system may be implemented, including pumping stations, piping, aqueducts, storage tanks, towers, reservoirs, etc. In such a utility network, the energy storage device 500 may be advantageously a pumped hydro storage device capable of dispatching water to the utility network 508 to increase local pressure or available supply analogous to a battery being discharged into an electrical grid.

The system controller 504 is also part of a system of components that is used to dispatch energy from the energy storage device to the utility network 508. In order to dispatch energy, the system controller 504 permits energy stored in the energy storage device to be redistributed into the utility network 508. This may entail an actual discharge of the energy into the utility network, or may be a provision of energy to an outside party or location from which the energy becomes available to the utility provider when a discharge has taken place or when the utility provider elects to cause a discharge of the energy. For electrical systems with an electrical distribution grid for a utility network 508, this may mean discharging a portion of energy into the grid through a network interface 506. In hydro systems with a water-based utility network 508, the energy storage device may be a pumped hydro tank that is dispatched by connecting the tank to a water distribution network. Actuating the dispatch of energy may be effected by means already mentioned including a network interface 506, but may also take place through use of power converters such as DC-DC converters or AC-DC inverters that adapt electrical energy from the energy storage device 500 to a state of distribution to the utility network 508. In some embodiments, the system controller 504 and other devices that assist in dispatching energy to the utility network by having controls that can be accessed to engage a dispatch of energy, control the amount of energy dispatched, adjust the characteristics of the energy dispatched (e.g., voltage, amperage), and change the nature and degree of allocation of the energy stored in the energy storage device 500.

A transceiver 509 is shown attached to the system controller 504 which may be used to relay information between a control center 510 and the system controller 504. The transceiver 509 may be an additional part of the overall means used to allocate and dispatch energy to the utility network 508. Instructions for the system controller 504 may be assigned from the control center 510 via the transceiver 509, and status data, alerts, and other information may be sent to the control center as well. A transceiver 509 may connect to the control center 510 by wireless or wired methods, such as telephone wire, optical fiber network, copper wire, Ethernet, wi-fi, cellular or satellite communications, and other similar communication means, as represented by the dashed double-ended arrow in the figure. The control center 510 may include a structure operated by the utility provider, a computer, server, smartphone, remote or mobile command center, or other electronic equipment for sending, receiving, and displaying information associated with the energy storage device 500.

The dashed line within the energy storage device 500 represents the allocating or partitioning of the energy stored within the energy storage device 500 between the customer (e.g., portion 512) and the utility provider (e.g., portion 514). Although the energy storage device 500 in this figure is allocated into two portions, greater numbers of portions may be implemented and allocated to other parties, or multiple portions may be allocated to the same party. The connection between the energy storage device 500 and the system controller 504 links to energy storage portion 514 specifically in this figure, but this representation is not intended to limit other embodiments and configurations. The energy storage device 500 may connect to the system controller 504 with portion 512, both portions 512 and 514, or with another division of the energy storage device (not pictured). For the purposes of this embodiment, portion 514 is allocated to the utility provider, so it is important for that portion 514 in particular to be monitored by the system controller 504 and for purposes of assisting in restoration or dispatch of the energy stored therein.

As discussed elsewhere in this specification, allocation of energy stored in the energy storage device 500 may be brought about by physical, electrical, and virtual means, or any other method that provides separation of availability of energy for multiple parties.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In addition, it should be understood that the figures described above, which highlight the functionality and advantages of the present invention, are presented for example purposes only and not for limitation. The exemplary architecture of the present invention is sufficiently flexible and configurable, such that it may be utilized in ways other than that shown in the figures. It will be apparent to one of skill in the art how alternative functional, logical or physical partitioning, and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in multiple various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the time described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are describe in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A method of allocating energy storage between a utility provider and a customer, the method comprising:
   providing a power management system at a site of a customer of a utility provider, the power management system including a system controller and an energy storage device connected to a utility network of the utility provider, the system controller being configured to manage the charge and discharge actions of the energy storage device;
   allocating a first portion of energy stored in the energy storage device for use by the utility provider upon discharge of the first portion of energy into the utility network and allocating a second portion of energy stored in the energy storage device for use by the customer, wherein the first and second portions of energy are allocated by at least one of physically partitioning, electrically partitioning, or virtually partitioning the first and second portions of energy from each other;
   providing direct control to the utility provider over the dispatch of the first portion of energy into the utility network by granting control over the system controller to the utility provider;
   providing an incentive to the customer to reserve the first portion of energy stored in the energy storage device for use by the utility provider without transferring the first portion of energy to the utility provider;
   compensating a party other than the customer as a result of the party other than the customer allocating the second portion of energy for the use of the customer independent of the utility provider.

2. The method of claim 1, further comprising storing the first portion of allocated energy and the second portion of allocated energy in the energy storage device.

3. The method of claim 1, further comprising yielding part of the first portion of allocated energy to the utility network.

4. The method of claim 3, wherein the yielding of allocated energy is performed at the discretion of the utility provider.

5. The method of claim 1, further comprising receiving part of the first portion of allocated energy into the utility network.

6. The method of claim 1, further comprising preventing the customer from consuming a portion of allocated energy.

7. The method of claim 1, further comprising compensating the customer for allocating the first portion of energy stored in the energy storage device for the use of the utility provider.

8. The method of claim 1, further comprising connecting the energy storage device to the utility network.

9. The method of claim 1, wherein the first portion of allocated energy is stored in a division of the energy storage device and is cycled between said division and one or more other divisions of the energy storage device.

10. The method of claim 1, wherein the first portion of allocated energy is allocated from an energy storage device operated by the customer.

11. The method of claim 1, wherein the second portion of allocated energy is allocated from an energy storage device operated by a party other than the customer.

12. The method of claim 1, wherein the benefit to the utility provider includes demand reduction in the utility network.

13. The method of claim 1, wherein the energy storage device is part of one of (a) a backup power source, (b) a power management system, (c) a load leveling device, and (d) a peak mitigation device.

14. The method of claim 1, wherein the utility provider is represented by an agent, employee, or other representative acting under the direction of a utility production or distribution administrator.

15. A method comprising:
    receiving part of a first allotment of energy that has been discharged into a utility network from an energy repository, the first allotment of energy having been reserved for use by a utility network administrator, the first allotment of energy having been stored in the energy repository with a second allotment of energy that has been reserved for use by a customer, the first and second allotments of energy having been at least one of physically partitioned, electrically partitioned, or virtually partitioned from each other at the energy repository;
    compensating a party other than the customer as a result of the party other than the customer allocating the second portion of energy for the use of the customer, wherein the party other than the customer allocates the second portion of energy for the use of the customer independent of the utility provider;
    wherein the first allotment of energy is discharged into the utility network under direct control of the utility network administrator.

16. The method of claim 15, wherein the discharged reserved energy supplements another energy source in the utility network.

* * * * *